United States Patent [19]

Asai et al.

[11] Patent Number: 4,641,267

[45] Date of Patent: Feb. 3, 1987

[54] GRADATION CORRECTION CURVE CREATING METHOD AND APPARATUS

[75] Inventors: Eiichi Asai; Hiroshi Tanaka; Nobuaki Higashi, all of Kanagawa, Japan

[73] Assignee: Fuji Photo Film Co., Ltd., Kanagawa, Japan

[21] Appl. No.: 547,620

[22] Filed: Nov. 1, 1983

[30] Foreign Application Priority Data

Nov. 4, 1982 [JP] Japan .............................. 57-193770

[51] Int. Cl.$^4$ ...................... G06F 15/42; G06G 7/60; H04N 1/40; H01Q 21/00

[52] U.S. Cl. .................................... 364/414; 250/337; 358/111; 358/284; 358/280; 340/728

[58] Field of Search ............... 364/414, 415, 518, 571; 358/111, 280, 284; 250/327.2, 337, 354.1, 484.1, 486.1; 382/54; 340/727, 728, 720

[56] References Cited

U.S. PATENT DOCUMENTS

| | | | |
|---|---|---|---|
| 4,314,337 | 2/1982 | Kowalski | 364/414 |
| 4,315,318 | 2/1982 | Kato et al. | 358/264 X |
| 4,346,409 | 8/1982 | Ishida et al. | 364/414 X |
| 4,356,398 | 10/1982 | Komak et al. | 364/414 |
| 4,387,428 | 6/1983 | Ishida et al. | 250/337 X |
| 4,405,920 | 9/1983 | Weisstein | 340/700 |
| 4,446,487 | 5/1984 | Horikawa | 358/280 |
| 4,450,478 | 5/1984 | Ledley | 364/414 X |
| 4,476,497 | 10/1984 | Oshikoshi et al. | 364/414 X |

*Primary Examiner*—Jerry Smith
*Assistant Examiner*—Jon D. Grossman
*Attorney, Agent, or Firm*—Sughrue, Mion, Zinn, Macpeak & Seas

[57] ABSTRACT

In a radiation image system wherein a stimulable phosphor carrying a radiation image stored therein is exposed to stimulating rays which cause it to emit light in proportion to the radiation energy stored, and the emitted light is detected and converted to an electric signal which is processed to reproduce a visible image, several reference gradation correction curves are created on an orthogonal system of signal level-optical density coordinates. One of the reference curves is selected and rotated around a point on the reference curve on the coordinate system, and/or parallel-shifted on the coordinate system to obtain a desired gradation correction curve.

5 Claims, 5 Drawing Figures

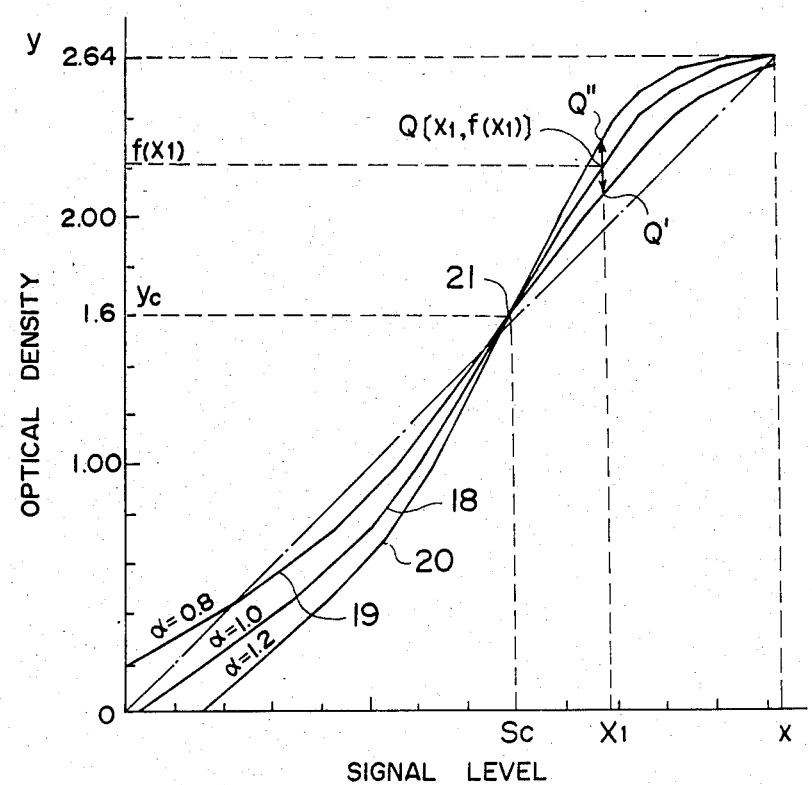
F I G. 5

GRADATION CORRECTION CURVE CREATING METHOD AND APPARATUS

BACKGROUND OF THE INVENTION

1. Field of the Invention

This invention relates to a method of creating a curve for correcting the gradation of a radiation image used for viewing, particularly for diagnostic purposes, and an apparatus for carrying out the method. This invention particularly relates to a method of creating a gradation correction curve used for conducting intermediate processing in a radiation image system wherein a radiation image is read out from a stimulable phosphor carrying the radiation image stored therein and reproduced into a visible image, and an apparatus for carrying out the method.

2. Description of the Prior Art

A novel radiation image system for recording a radiation image in a stimulable phosphor, reading out the radiation image from the stimulable phosphor, and reproducing a visible radiation image on a recording material such as a photographic film is disclosed, for example, in U.S. Pat. No. 4,258,264. This system comprises the steps of having a radiation passing through an object and then absorbed by a stimulable phosphor, stimulating the phosphor by light energy to cause the phosphor to emit the radiation energy stored therein as light, detecting the emitted light and converting it to an electric signal used for reproducing a visible image.

This radiation image system, using the stimulable phosphor, is advantageous over the conventional radiography using a silver halide photographic material in that the image can be recorded over a very wide range of radiation exposure. This is very advantageous in practical use.

Since X-rays do harm to the human body, it is undesirable from the viewpoint of safety to expose the human body to X-rays of high dose. Therefore, it is desirable that the necessary information in the radiograph be obtainable by exposing the human body only once to X-rays of comparatively low dose. On the other hand, radiographs should preferably have both a wide exposure latitude and high image quality suitable for viewing, particularly for diagnostic purposes. Unfortunately, since the conventional radiography is designed so as to satisfy all the required conditions to some extent, the range of recording density or the ability to record various levels of information is insufficient (one approach to the elimination of this problem is the aforesaid radiation image system using the stimulable phosphor), and the image quality is not sufficient for viewing, particularly for diagnostic purposes. Thus, in the conventional radiography, neither of these requirements is completely satisfied.

To solve the above problems, it has been proposed in U.S. Pat. No. 4,302,672 to improve the image quality, particularly the diagnostic efficiency and accuracy of a radiation image by, when a frontal chest radiation image stored in a stimulable phosphor is reproduced into a visible image on a recording material, conducting an intermediate processing for correcting the gradation of the radiation image so that the contrast of the background of the human body is decreased, thereby increasing the contrast of the heart and the lungs. Namely, in this gradation processing method, density-to-electric signal conversion is conducted to correct the gradation as described above.

In general, when the aforesaid gradation processing method is carried out, a density-to-electric signal conversion pattern (i.e. the gradation correction pattern) adapted to the object and the use purpose is created in advance. On the basis of this pattern, a signal conversion processing is conducted on an electric signal obtained by reading out the radiation image from a stimulable phosphor and converting it photoelectrically, thereby to conduct the gradation processing. The aforesaid gradation correction pattern is normally called the gradation correction curve.

However, in the aforesaid gradation processing method, when the gradation correction curves are created according to various objects and various use purposes, the number of the gradation correction curves becomes about several tens. Therefore, very much manpower is required for gathering the data for creating the gradation correction curves, and an electronic computer or the like having a very large capacity for digitally converting and storing the data. Thus, from the practical viewpoint, this method is not simple.

SUMMARY OF THE INVENTION

The primary object of the present invention is to provide a method of creating a gradation correction curve, which creates many gradation correction curves according to various objects and various purposes by converting a basic gradation correction pattern.

Another object of the present invention is to provide a method of creating a gradation correction curve, which quickly creates many desired gradation correction curves by use of a data storage means having a small storage capacity.

The specific object of the present invention is to provide an apparatus for carrying out the method.

The present invention provides a method of creating a curve for correcting the gradation of a radiation image recorded in a stimulable phosphor in a pattern of radiation energy stored therein wherein said stimulable phosphor is scanned with stimulating rays to cause it to emit light in an amount proportional to the level of the radiation energy stored, the emitted light is detected and converted to an electric signal having a level corresponding to the emitted amount of the light, and a visible image corresponding to said radiation image is reproduced on a recording material by use of the electric signal, the method of creating a curve for correcting the gradation of the radiation image comprising the steps of:

(i) creating several reference curves on an orthogonal system of signal level-optical density coordinates wherein the optical density of the visible image reproduced on said recording material is plotted on one coordinate axis, and the level of said electric signal is plotted on the other coordinate axis, (ii) selecting one of said reference curves, and (iii) rotating the selected reference curve around a point on said reference curve on said coordinate system, and/or parallel-shifting said reference curve on said coordinate system, thereby obtaining a desired gradation correction curve.

In the method of the present invention, many desired gradation correction curves can be obtained from one of several (about ten) basic gradation correction curves by rotating and/or parallel-shifting the basic gradation correction curve according to the object, the radiation source voltage, the purpose, or the like. Since it is sufficient that only the data on the basic gradation correction curves be stored in a data storage means such as an electronic computer, the method of the present invention is advantageous in that the size of the required data storage means can be reduced. The method is advantageous also in that processing can be conducted quickly.

By "gradation correction curve" is meant a curve representing the relationship between the optical density of a reproduced visible image and the level of the electric signal obtained by photoelectrically converting the brightness of the object. The gradation correction curve is of the type usually used in field image processing.

FIG. 1 is an explanatory graph showing the rotation of a gradation correction curve conducted according to the method of the present invention. By "rotation" is meant that, as shown in FIG. 1, a new curve is created from a reference curve by shifting the points on the reference curve in the x coordinate axis direction or in the y coordinate axis direction by a distance proportional to the distance from the center of rotation (O) on the reference curve to the x coordinates or to the y coordinates of the respective points. For example, when the center of rotation (O) on the reference curve has the coordinates (xo, f(xo)) and an arbitrary point P on the reference curve has the coordinates (x1, f(x1)), the coordinates (x2, y2) of a point P' on a new curve corresponding to the point P, which is obtained by rotating the reference curve in the x coordinate axis direction or in the y coordinate axis direction, are represented by the following formulae:

rotation in x coordinate axis direction:

$$\begin{cases} x2 = \alpha(x1 - x0) + x0 \\ y2 = f(x1) \end{cases}$$

rotation in y coordinate axis direction:

$$\begin{cases} x2 = x1 \\ y2 = \beta(f(x1) - f(x0)) + f(x0) \end{cases}$$

wherein $\alpha$ and $\beta$ designate the coefficients with respect to the rotation.

In the present invention, the rotation or the parallel-shift also embraces the case wherein the amount of the rotation or the parallel-shift is zero.

The stimulable phosphor referred to in this invention means a phosphor which is able to store radiation energy upon exposure thereof to a high energy radiation and then emits light according to the stored energy upon optical stimulation. The high energy radiation referred to here includes X-rays, $\alpha$-rays, $\beta$-rays, $\gamma$-rays, neutron rays, ultraviolet rays and the like.

As for the stimulating rays for stimulating the phosphor after the phosphor is excited with the radiation energy in an image pattern, a light beam having high directivity like a laser beam is used. The light beam having a wavelength within the range of 500 to 800 nm, preferably within the range of 600 to 700 nm. If a cut filter, which cuts the light having a wavelength beyond the above range, is used together with a stimulating ray source, a stimulating ray source having a wavelength distribution beyond said range can be used.

As for the stimulating ray source which emits the light having the above mentioned wavelength region, a Kr-laser (647 nm), a He-Ne laser (633 nm), various kinds of light emitting diodes, a rhodamine B dye laser or the like can be used. Further, a tungsten iodine lamp having a wide wavelength distribution covering near ultraviolet rays, visible light and infrared rays can be used if combined with a cut filter which only transmits light of the wavelength within the range of 500 to 800 nm or 600–700 nm.

Since the ratio of the stimulating energy and emitted light energy is generally $10^4:1$ to $10^6:1$, the S-N ratio would be markedly lowered if the stimulating rays should enter the photodetector. Therefore, in order to prevent the lowering of the S/N ratio, it is desirable to make the wavelength distribution of the stimulating rays different from and far apart from the wavelength distribution of the light emitted from the stimulable phosphor.

In order to meet this requirement, the stimulable phosphor is desired to emit light having a wavelength within the range of 300 to 500 nm. For example, rare earth element activated alkaline earth metal fluorohalide phosphor is preferred. One example of this phosphor is, as shown in DE-OS No. 29 28 245, a phosphor represented by the formula $(Ba_{1-x-y},Mg_x,Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS : Cu,Pb; $BaO.xAl_2O_3$: Eu wherein $0.8 \leq x \leq 10$; and $M^{II}$-$O.xSiO_2$: A wherein $M^{II}$ is Mg, Ca, Sr, Zn, Cd or Ba, A is Ce, Tb, Eu, Tm, Pb, Tl, Bi or Mn, and x is number satisfying $0.5 \leq x \leq 2.5$, as shown in U.S. Pat. No. 4,236,078. Furthermore, as the stimulable phosphor can be used LnOX : xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors containing at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. Pat. No. 4,394,581.

BRIEF DESCRIPTION OF THE DRAWINGS

FIG. 5 is a graph showing the gradation correction curves created by an embodiment of the method in accordance with the present invention.

DESCRIPTION OF THE PREFERRED EMBODIMENTS

The present invention will hereinbelow be described in further detail with reference to the accompanying drawings.

Figure 2:
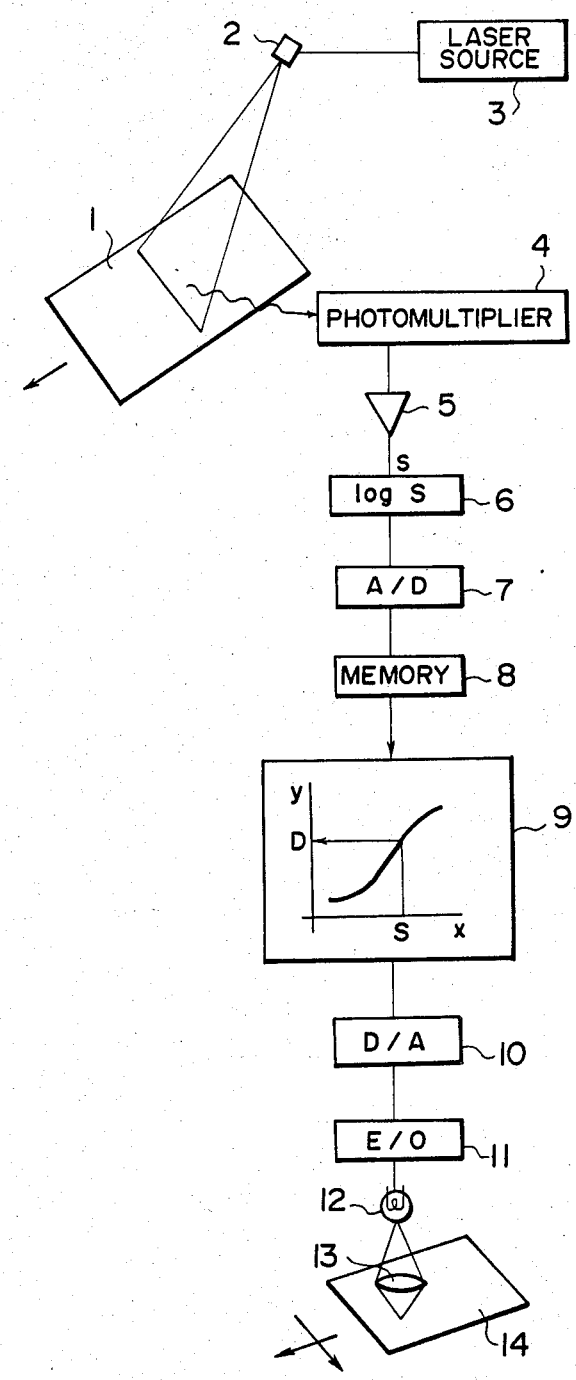
FIG. 2 is a block diagram showing the whole radiation image system wherein an embodiment of the method in accordance with the present invention is employed.

Referring to FIG. 2, a stimulable phosphor sheet 1 carrying a radiation image stored therein is scanned with a laser beam emitted from a laser beam source 3 via a scanning mirror 2 to cause the phosphor sheet 1 to emit light in proportion to the radiation energy stored therein. The emitted light is received by a photomultiplier 4 to read out the radiation image stored in the phosphor sheet 1. The output of the photomultiplier 4 is amplified by an amplifier 5, logarithmically converted by a logarithmic conversion circuit 6, and then converted to a digital signal by an A/D conversion circuit 7. The digital signal thus obtained is once stored in a memory 8 such as a magnetic disk. In a gradation correction circuit 9, a desired gradation correction curve is created according to the object and the purpose by rotating and/or parallel-shifting a reference gradation correction curve, which has been selected from several reference curves memorized in advance in an electronic computer, on the signal leveloptical density coordinate system. On the basis of this desired gradation correction curve, the digital signal stored in the memory 8 is processed. This processing is conducted in a digital operation circuit. Instead of once storing the digital signal in the memory 8, the digital signal obtained by the A/D conversion circuit 7 may be directly sent to the gradation correction circuit 9 for conducting the gradation correction. The output signal obtained by the processing in the digital operation circuit is then converted to an analog signal by a D/A conversion circuit 10. The analog signal is then converted to a light signal by an E/O modulator (light modulator), thereby to emit light of an amount corresponding to the light signal from a light source 12 for image reproducing. The light emitted from the light source 12 is condensed onto a recording material 14 such as a photographic film by a condenser lens 13. While the light impinges upon the recording material 14, the recording material 14 is two-dimensionally moved in the directions of the arrows. In this manner, a visible image is reproduced on the recording material 14. As described above, the stimulable phosphor sheet 1 is scanned with the laser beam while the phosphor sheet 1 is moved perpendicularly to the scanning direction. On the other hand, the recording material 14 is two-dimensionally moved while it is exposed to the light the optical axis of which is stationary.

In the embodiment as described above, a desired gradation correction curve is obtained by rotating and/or parallel-shifting a reference gradation correction curve, which is selected from about ten reference gradation correction curves, according to the object and the purpose. Therefore, many (for example, several hundreds of) desired gradation correction curves can be created easily by use of a smaller amount of information than the amount of information required in the conventional method. Accordingly, it is possible to reduce the size of the electronic computer used for the correction of gradation. Further, in this embodiment, since many gradation correction patterns are coordinated to a few reference patterns and the information is automatically arranged, it becomes easy to select a necessary gradation correction pattern and to quickly conduct the image processing.

Figure 1:
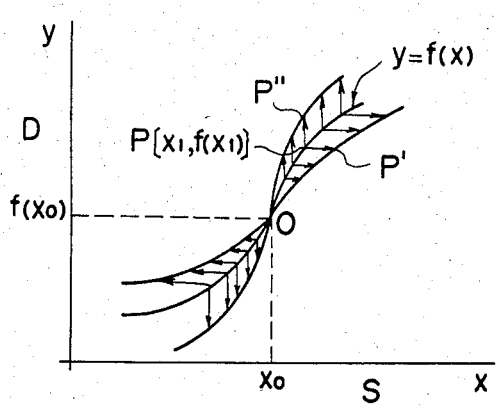
FIG. 1 is an explanatory graph showing the rotation of a gradation correction curve conducted in the method in accordance with the present invention.
Figure 3:
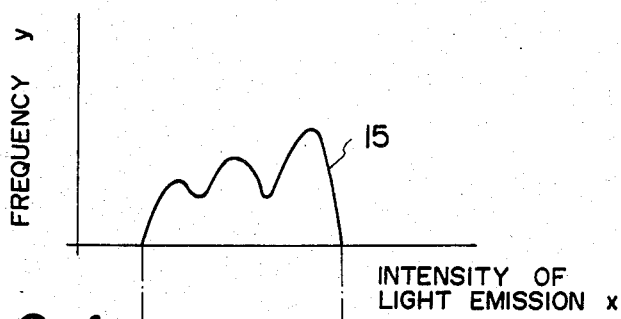
FIGS. 3 and 4 are graphs showing the distribution of the amount of a radiation passing through the frontal chest of the human body.
Figure 4:
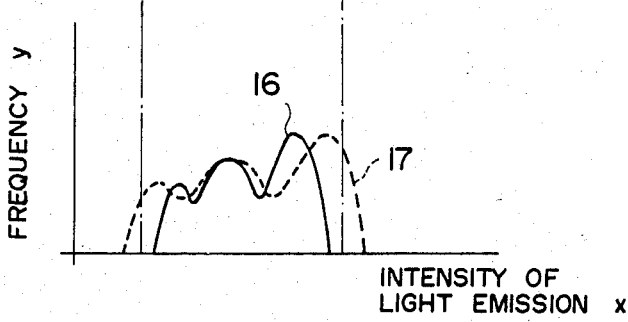

FIGS. 3 and 4 show the distribution of the amount of a radiation passing through the frontal chest of the human body. In FIG. 3, a curve 15 indicates the aforesaid distribution obtained when the radiation tube voltage is set to 100 kVp. In FIG. 4, a curve 17 indicates the aforesaid distribution obtained when the radiation tube voltage is adjusted to 80 kVp to record the radiation image of the same object as in FIG. 3, and a curve 16 indicates the distribution obtained when the radiation tube voltage is adjusted to 120 kVp to record the radiation image of the same object as in FIG. 3. In FIGS. 3 and 4, the x coordinate axis indicates the intensity of light emission, and the y coordinate axis indicates the frequency. As shown in FIGS. 3 and 4, the width of the distribution obtained when the radiation tube voltage is adjusted to 80 kVp is larger than when it is adjusted to 100 kVp, and the width of the distribution obtained when it is adjusted to 120 kVp is smaller than when it is adjusted to 100 kVp. Such a difference in the width of the distribution is generated since the output contrast is changed by a change in the radiation tube voltage.

In the embodiment described above, in order to correct the change in the output contrast generated by a change in the tube voltage, gradation correction curves adapted to the distributions at the tube voltages of 80 kVp and 120 kVp are obtained by rotating the gradation correction curve for the tube voltage of 100 kVp, and gradation processing is conducted based on the gradation correction curves thus obtained.

FIG. 5 shows the aforesaid three gradation correction curves 18, 19 and 20. In FIG. 5, the x coordinate axis indicates the electric signal level, and the y coordinate axis indicates the optical density of the reproduced visible image. The curve 19 adapted to the tube voltage of 80 kVp and the curve 20 adapted to the tube voltage of 120 kVp are obtained by adjusting the rotation coefficients ($\alpha$) to 0.8 and 1.2, respectively, and rotating thereby the gradation correction curve 18 for the tube voltage of 100 kVp around a point 21 on the curve 18 corresponding to an optical density yc=1.6. When carrying out the rotation around the point 21 on the reference curve 18, the movement amount is calculated by multiplying the distance along the y coordinate axis between the point 21 and an arbitrary point Q on the curve 18 by the rotation coefficient ($\alpha$), and the calculated movement amount is added to the y coordinate value of the center of rotation (i.e. the point 21), thereby to determine the y coordinate value of a point Q' on the curve obtained after the rotation, which corresponds to the point Q. Namely, in this embodiment, when the center of rotation has the coordinates (Sc, 1.6) and the arbitrary point Q on the gradation correction curve 18 for the tube voltage of 100 kVp has the coordinates (x1, f(x1)), the coordinates of the point Q' on the gradation correction curve 19 for the tube voltage of 80 kVp which corresponds to the point Q and the coordinates of the point Q" on the gradation correction curve 20 for the tube voltage of 120 kVp which corresponds to the point Q are represented by the following formulae:

$$Q': \begin{aligned} x &= x1 \\ y &= 0.8(f(x1) - 1.6) + 1.6 \\ &= 0.8f(x1) + 0.32 \end{aligned}$$

$$Q'': \begin{aligned} x &= x1 \\ y &= 1.2(f(x1) - 1.6) + 1.6 \\ &= 1.2f(x1) - 0.32 \end{aligned}$$

Namely, in the case wherein the tube voltage is adjusted to 80 kVp, an image of the same contrast as the contrast obtained when the tube voltage is adjusted to 100 kVp can be obtained by decreasing the density at a portion having a density higher than the optical density yc=1.6 and increasing the density at a portion having a density lower than the optical density yc=1.6. Conversely, in the case wherein the tube voltage is adjusted to 120 kVp, the density at a portion having a density higher than the optical density yc=1.6 is increased, and the density at a portion having a density lower than the optical density yc=1.6 is decreased.

In the embodiment described above, when the tube voltage is changed, the output contrast is corrected by rotating the reference gradation correction curve and creating a desired gradation correction curve. Also when the object is changed or when the output contrast should partially be changed, an image of an appropriate image quality can be obtained in the same manner as described above.

In the case of the above-mentioned embodiment, only rotation is conducted, and the amount of parallelshift is zero.

We claim:

1. A method of creating a curve for correcting the gradation of a radiation image which is first recorded in a stimulable phosphor as a pattern of radiation energy having a radiation energy level wherein said stimulable phosphor is then scanned with stimulating rays to cause the stimulable phosphor to emit light of an amount proportional to the level of the stored radiation energy, the emitted light is then detected and converted to an electric signal having an electric signal level corresponding to the emitted amount of the light, and a visible image corresponding to said radiation image can then be reproduced on a recording material by use of the electric signal, the method of creating a curve for correcting gradation of the radiation image comprising the steps of:
(i) creating several reference curves on an orthogonal system of signal level-optical density coordinates wherein the optical density of the visible image reproduced on said recording material is plotted on one coordinate axis and the level of said electric signal is plotted on the other coordinate axis,
(ii) selecting one of said reference curves, and
(iii) rotating the selected reference curve around a point on said reference curve on said coordinate system, and/or parallel-shifting said reference curve on said coordinate system, thereby obtaining a desired gradation correction curve.

2. A method as defined in claim 1 wherein said electric signal is a digital signal.

3. A method as defined in claim 1 wherein said stimulating rays are laser beams.

4. A method as defined in claim 1 wherein said reference curve and said desired gradation correction curve correspond to the magnitude of a radiation source employed for generating the radiation image.

5. An apparatus for creating a curve for correcting gradation of a radiation image in a radiation image system which comprises:
a radiation image read-out means including a scanning means for scanning or stimulating a stimulable phosphor carrying a stored radiation image, with stimulating rays and reading means for reading out the stored radiation image by detecting the light emitted from the stimulable phosphor upon stimulation and converting the light to an electric signal having a level corresponding to the amount of the emitted light;
a signal processing means for processing the electric signal;
a modulating means controlled by the processed electric signal; and,
a recording means controlled by the modulating means for reproducing on a recording material a visible image corresponding to the radiation image recorded in the stimulable phosphor,
said signal processing means comprising a gradation correction means for creating a desired gradation correction curve by rotating a reference curve selected from several reference curves, which have been created on an orthogonal system of signal level-optical density coordinates, wherein the optical density of the visible image reproduced on said recording material is plotted on one coordinate axis and the level of said electric signal is plotted on the other coordinate axis, said electric signal having been stored in advance in a storage means, around a point on said reference curve on said coordinate system, and/or parallel-shifting said reference curve on said coordinate system.

* * * * *